US007851026B2

(12) United States Patent
Kuramochi et al.

(10) Patent No.: US 7,851,026 B2
(45) Date of Patent: Dec. 14, 2010

(54) METHOD OF FORMING A MULTI-LAYER COATING INCLUDING A METALLIC BASE COATING AND A COLORED CLEAR COATING ON A SUBSTRATE

(75) Inventors: Tatsuo Kuramochi, Kanagawa (JP); Takashi Kawasaki, Kanagawa (JP)

(73) Assignee: Kansai Paint Co. Ltd., Tokyo (JP)

( * ) Notice: Subject to any disclaimer, the term of this patent is extended or adjusted under 35 U.S.C. 154(b) by 930 days.

(21) Appl. No.: 10/976,779

(22) Filed: Nov. 1, 2004

(65) Prior Publication Data

US 2005/0208292 A1 Sep. 22, 2005

(30) Foreign Application Priority Data

Nov. 17, 2003 (JP) ............................. 2003-386075

(51) Int. Cl.
  *B05D 5/06* (2006.01)
  *B05D 7/16* (2006.01)
  *B05D 3/02* (2006.01)

(52) U.S. Cl. .................. 427/419.1; 427/407.1; 427/380
(58) Field of Classification Search ................. 427/409, 427/372.2, 379, 380, 419.1, 407.1
See application file for complete search history.

(56) References Cited

U.S. PATENT DOCUMENTS 6,165,621 A * 12/2000 Kasari et al. ................. 428/457

* cited by examiner

*Primary Examiner*—William Phillip Fletcher, III
(74) *Attorney, Agent, or Firm*—Rader, Fishman & Grauer PLLC

(57) ABSTRACT

The present invention provides a coating method comprising steps of applying a metallic base coating (A) containing a effective pigment on a surface to be coated and subsequently applying a colored clear coating (B) thereon, wherein the metallic base coating (A) forms a coating film having a IV value of 230 or more and a measured value of particle feeling (HG value) on a micro brilliance feeling-measuring apparatus of 60 or less. The method of the present invention is suitable as a top coating for outer panels of automobiles and the like.

11 Claims, No Drawings

METHOD OF FORMING A MULTI-LAYER COATING INCLUDING A METALLIC BASE COATING AND A COLORED CLEAR COATING ON A SUBSTRATE

TECHNICAL FIELD

The present invention relates to a coating method which is capable of forming a multilayer coating film having metallic coating color having fine particle feeling and metallic feeling and further having high-chroma and highly deepness feeling and which is suitable as a top coating for outer panels of automobiles and the like.

BACKGROUND ART

Metallic coating film glitters by an incident light from outside reflected at a metallic pigment contained in the coating film and has a specific beautiful appearance rich in variation coupled with various color tones of the coating film. Therefore, the coating film is applied particularly to metal articles of automobiles, motorcycles, and the like.

As a method for forming the metallic coating film, Japanese Patent Publication No. 38267/1990 describes a metallic coating method wherein, on a metallic base coating film containing a relatively deep-colored pigment, a colored clear coating film containing a high-chroma pigment having a similar color to that of the relatively deep-colored pigment is formed. Moreover, WO97/47396 (U.S. Pat. No. 6,165,621) describes a method for forming a metallic coating film wherein a metallic base coating, a transparent second base coating, and a clear coating are successively applied.

However, in the method described in Japanese Patent No. 2-38267, since the relatively dark-colored pigment in the metallic base coating film lowers a metallic feeling, there arises a problem that it is difficult to obtain a deepness feeling and a high-chroma feeling of the metallic coating film. Moreover, in the method described in WO97/47396, since a slight variation of the thickness of the transparent second base coating film changes a coating color to a large extent, there arise problems that it is difficult to control a coating line and also the color of the edge part which is apt to have a larger film thickness as compared to an ordinary part becomes dark, i.e., so-called frame phenomenon occurs.

Thus, the present applicant has proposed a method for forming a metallic coating film, which is capable of obtaining a metallic coating film excellent in a deepness feeling and a high-chroma feeling and which also exhibits a small variation of the coating color by film thickness variation and allows an easy control of the coating line without occurrence of the frame phenomenon, by forming a bilayer colored clear coating film having a specific light transmittance on a metallic base coating film and preferably making the coating color of the metallic base coating film a specific one (for example, cf. Japanese Patent Laid-Open No. 2002-86057). However, a coating color having denser particle feeling and metallic feeling has been desired and the method described in Japanese Patent Laid-Open No. 86057/2002 is insufficient.

DISCLOSURE OF THE INVENTION

An object of the present invention is to provide a coating method which is capable of forming a multilayer coating film having fine particle feeling and metallic feeling and further having high-chroma and highly deepness feeling and which is suitable as a top coating for outer panels of automobiles and the like.

As a result of the extensive studies for solving the above problems, the present inventors have found that a multilayer coating film having very fine particle feeling and metallic feeling and further having high-chroma and highly deep feeling can be formed by forming a metallic base coating film having a specific property and further changing the clear coating film into a colored clear. Thus, they have accomplished the present invention.

Namely, the present invention relates to a coating method comprising steps of applying a metallic base coating (A) containing a effective pigment on a surface to be coated and subsequently applying a colored clear coating (B) thereon, wherein the metallic base coating (A) forms a coating film having an IV value of 230 or more and a measured value of particle feeling (HG value) on a micro brilliance feeling-measuring apparatus of 60 or less.

According to the method of the present invention, very fine particle feeling and metallic feeling can be imparted by forming a specific metallic base coating film and furthermore a multilayer coating film having high-chroma and highly deepness feeling can be formed by applying a colored clear on the metallic base coating film. The coating method of the invention is very useful as a top coating for outer panels of automobiles, parts, and the like.

The following will describes the present invention further in detail.

The method of the present invention comprises steps of applying a metallic base coating (A) on a surface to be coated and subsequently applying a colored clear coating (B) thereon.

Examples of the above substrate to be coated include outer panels of automobiles, and metal or plastic materials for use as automobile parts such as bumper and wheel. If necessary, the material may be one to which an undercoating such as a cationic electrodeposition coating, an intermediate coat, and the like are successively applied and which is then cured or it may be in an uncured state.

The metallic base coating (A) for use in the method of the present invention contains an effective pigment as an essential component and, if necessary, a coloring pigment and/or dye. Usually, it uses an organic solvent and/or water as main solvents and further contains a base resin and a crosslinking agent.

Examples of the effective pigment include aluminum flakes, vapor-deposited aluminum, metal oxide-covered alumina flakes, metal oxide-covered silica flakes, graphite pigments, metal oxide-covered mica, titanium flakes, stainless flakes, bismuth oxychloride, plate-type iron oxide pigments, metal-plated glass flakes, metal oxide-covered glass flakes, hologram pigments, and the like, and they can be used solely or two or more of them can be used in combination. It is desirable to use one having an aspect ratio (average particle size/average thickness) of about 30 or more as the effective pigment from the viewpoint of orientation.

The mixing amount of the above effective pigment is suitably in the range of 5 to 100 parts by weight, preferably from 10 to 50 parts by weight based on 100 parts by weight of resin solid matter in the coating (A).

Examples of the coloring pigment include titanium dioxide, carbon black, zinc oxide, molybdenum red, prussian blue, cobalt blue, phthalocyanine pigments, azo pigments, quinacridone pigments, isoindoline pigments, threne-based pigments, perylene pigments, and the like, and they can be used solely or two or more of them can be used in combination. Examples of the dye include azo dyes, anthraquinone dyes, indigo dyes, carbonium dyes, quinonimine dyes, phthalocyanine dyes, and the like, and they can be used solely or two or more of them can be used in combination. It is desirable to use one having an average particle size of about 0.1 μm or less as the coloring pigment from the viewpoint of not impairing metallic feeling.

The mixing amount of the above coloring pigment and dye is suitably in the range of 0.1 to 30 parts by weight, preferably from 1 to 30 parts by weight based on 100 parts by weight of resin solid matter in the coating (A).

Examples of the base resin for use in the metallic base coating (A) include acrylic resins, polyester resins, alkyd resins, and the like having a crosslinking functional group such as a hydroxyl group, an epoxy group, a carboxyl group, or a silanol group. Moreover, the crosslinking agent includes amino resins such as melamine resins and urea resins, polyisocyanates, blocked polyisocyanates, polyepoxides, polycarboxylic acids, and the like. The above polyepoxides and polycarboxylic acids may be polymers such as copolymers.

Into the metallic base coating (A) can be further incorporated suitably additives for coatings, such as extender pigments, curing catalysts, ultraviolet absorbents, coating surface-adjusting agents, rheology-controlling agents, antioxidants, defoaming agents, and waxes, if necessary.

The application of the metallic base coating (A) can be conducted by rotary electrostatic coating, air spraying (two-fluid nozzle), airless spraying, and the like.

In the present invention, it is essential that the coating film obtained by the above metallic base coating (A) has an IV value of 230 or more and a measured value of particle feeling (HG value) on a micro brilliance feeling-measuring apparatus of 60 or less, preferably 50 or less.

Herein, the "IV value" is an abbreviation of Intensity Value and means a degree of contrast, which is a characteristic value used as an index for orientation, metallic feeling, and the like of the effective pigment in a coating film containing the effective pigment. The larger value of the IV value means good orientation and high metallic feeling of the effective pigment. The IV value can be measured by means of "ALCORP" manufactured by Kansai Paint Co., Ltd.

Moreover, herein, "HG" is an abbreviation of Hi-light Graininess and the HG value is a measured value of particle feeling at highlight of the surface of the coating film, the value being obtained by means of a micro brilliance feeling-measuring apparatus. The "micro brilliance feeling" means an inherent metallic texture expressed in the coating color containing the effective pigment and corresponds to, for example, roughness, glitter, brightness, rough texture, particle size, and the like of aluminum, mica, or the like. The micro brilliance feeling-measuring apparatus is not particularly limited as far as it has a light source, a CCD camera, and an image analyzing apparatus. For example, an apparatus disclosed in Japanese Patent Laid-Open No. 2001-221690 (US2001-036309) can be applied. Specifically, the apparatus is capable of placing as a light source an optical fiber-type halogen light, to which a condensing lens is attached at the end, on a line perpendicular to a measuring surface; photographing the coating surface at an angle, where an irradiation light is not incident, by the CCD camera wherein an AF macro 100 mm F 2.8 lens is attached to "RD-175" manufactured by Minolta; cutting an original data of the photographed image into a digital image data of monochromatic 256 gradation having 512×512 pixels on a computer; and then subjecting the data to digital processing by an image-analyzing software. The HG value can be determined as follows: a two-dimensional power spectrum integration value is obtained according to the following equation (Num 1), the value being obtainable by integrating the power of low spatial frequency component from a spatial frequency spectrum obtained by two-dimensional Fourier transformation of the two-dimensional image obtained by photographing the light-irradiated coating surface by the CCD camera and normalizing the integrated power with a direct current component; and then the HG value is calculated as a value of MGR which is calculated according to the following linear expression based on the two-dimensional power spectrum integration value (IPSL value). Namely, MGR=[(IPSL×1000)-285]/2 when the IPSL value is 0.32 or more, MGR=[IPSL×(35/0.17) −(525/17)]/2 when the IPSL value is in the range of 0.15<IPSL<0.32, and MGR=0 when the IPSL value is 0.15 or less.

The MGR value is regarded as 0 when no particle feeling of the effective pigment is observed and is regarded as 100 when the most particle feeling of the effective pigment is observed. Thus, the dense one having a lesser "particle feeling" shows a lesser value.

$$\text{Two-dimensional power spectrum integral value} = \frac{\int_0^L \int_0^{2\pi} P(v, \theta) \, dv \, d\theta}{P(0, 0)} \quad \text{EQUATION}$$

wherein v is a spatial frequency, θ is an angel, P is a power spectrum, 0 to L means a low spatial frequency region, and L means an upper limit of an extracted frequency.

In the present invention, there are various techniques for setting the IV value and HG value to specific ranges. For example, there may be mentioned a method of increasing the concentration of the effective pigment to be mixed, a method of thinning the coating film obtained by the metallic base coating (A), a method of conducting multi-stage coating application, a method of lowering solid matter in the coating at its application, or the like method. The thinning of the film is a method of improving orientation of the effective pigment by applying a coating having a high concentration of the effective pigment (20 to 200 parts by weight, preferably 20 to 100 parts by weight, more preferably 25 to 80 parts by weight of the effective pigment based on 100 parts by weight of resin solid matter in the coating (A)) so that the coating film thickness (dry film thickness) becomes from 0.3 to 5 μm, preferably from 0.3 to 3 μm. The multi-stage coating application is a method of applying coatings at two or more stages, preferably at three or more stages and it is desirable from the viewpoint of improving orientation of the effective pigment that the application is conducted so that the coating film thickness at each stage particularly at and after the second stage becomes in the range of 0.3 to 5 μm, preferably 0.3 to 4 μm and baking or pre-heating is conducted after the first stage application.

The colored clear coating (B) for use in the method of the present invention is a colored clear mixed with a coloring pigment and/or dye to an extent not to inhibit transparency and is an organic solvent-based or water-based thermosetting coating containing resin components such as a base resin and a crosslinking agent and a solvent such as an organic solvent or water and, if necessary, further mixed with a effective pigment, an ultraviolet absorbent, a light stabilizer, and the like, the colored clear coating having a degree of transparency which allows visual observation of the metallic feeling of the underlying film through a clear coating film obtained from the coating.

The above coloring pigment and dye can be suitably selected from those listed in the description of the above metallic base coating (A) and can be used solely, or two or more of them can be used in combination. The mixing amounts of the coloring pigment and dye are suitably in the range of 0.01 to 20 parts by weight, preferably from 0.1 to 10 parts by weight based on 100 parts by weight of resin solid matter in the coating (B).

Examples of the base resin for use as the colored clear coating (B) include acrylic resins, polyester resins, alkyd resins, fluororesins, polyurethane, silicone-containing resins, and the like having a crosslinking functional group such as a hydroxyl group, a carboxyl group, a silanol group, an alkoxysilyl group, or an epoxy group and particularly, an acrylic resin containing a crosslinking functional group is suitable. Moreover, the crosslinking agent includes as melamine resins and urea resins, (blocked) polyisocyanates, epoxy compounds, carboxyl group-containing compounds, acid anhydrides, alkoxysilyl group-containing compounds, and the like which are reactive with the above functional groups. With regard to the ratio of the base resin and the crosslinking agent to be used, it is suitable that the former is in the range of 50 to 90% by weight, preferably 65 to 80% by weight and the latter is in the range of 50 to 10% by weight, preferably 45 to 20% by weight.

The colored clear coating (B) can be further mixed with additives for coatings, such as curing catalysts, coating surface-adjusting agents, rheology-controlling agents, antioxidants, defoaming agents, and waxes, if necessary.

In the method of the present invention, onto the coating film obtained by the above colored clear coating (B), a clear coating (C) can be further applied, if necessary, from the viewpoint of improving beautifulness, finished appearance, physical properties of the coating film, and the like of the multilayer coating film.

The clear coating (C) is an organic solvent-based or water-based thermosetting coating containing resin components such as a base resin and a crosslinking agent and a solvent such as an organic solvent or water and, if necessary, further mixed with an ultraviolet absorbent, a light stabilizer, and the like, the clear coating having a degree of transparency which allows visual observation of the metallic feeling of the underlying coating film through a clear coating film obtained from the coating. With regard to the clear coating (C), the mixing composition can be constituted by suitably selecting constitutional components from those exemplified in the description of the above colored clear coating (B).

The clear coating (C) may be a colored clear mixed with a coloring pigment and/or dye to an extent not to inhibit transparency. In that case, onto the coating film obtained by the clear coating (C), a clear coating (E) can be further applied from the viewpoint of improving beautifulness, finished appearance, physical properties of the coating film, and the like of the multilayer coating film. The clear coating (E) is an organic solvent-based or water-based thermosetting coating containing resin components such as a base resin and a crosslinking agent and a solvent such as an organic solvent or water and, if necessary, further mixed with an ultraviolet absorbent, a light stabilizer, and the like, the clear coating having a degree of transparency which allows visual observation of the metallic feeling of the underlying coating film through a clear coating film obtained from the coating. With regard to the clear coating (E), the mixing composition can be constituted by suitably selecting constitutional components from those exemplified in the description of the above colored clear coating (B).

The application of the colored clear (B), the clear coating (C), and furthermore the clear coating (E) can be conducted by rotary electrostatic coating, air spraying (two-fluid nozzle), airless spraying, and the like.

In the method of the present invention, it is also possible to apply the above metallic base coating (A) after the application of a colored base coating (D) onto the surface to be coated.

The above colored base coating (D) contains a coloring pigment and/or dye and usually, it uses an organic solvent and/or water as main solvent(s) and contains a base resin and a crosslinking agent.

Examples of the base resin for use as the colored base coating (D) include acrylic resins, polyester resins, alkyd resins, and the like having a crosslinking functional group such as a hydroxyl group, an epoxy group, a carboxyl group, or a silanol group. Moreover, the crosslinking agent includes amino resins such as melamine resins and urea resins, polyisocyanates, blocked polyisocyanates, polyepoxides, polycarboxylic acids, and the like. The above polyepoxides and polycarboxylic acids may be polymers such as copolymers.

Examples of the coloring pigment for use in the colored base coating (D) include white pigments such as titanium white and zinc oxide; blue pigments such as cyanine blue and indathrene blue; green pigments such as cyanine green and verdigris; organic red pigments such as azo types and quinacridone types; red pigments such as red iron oxide; organic yellow pigments such as benzimidazoline types, isoindolinone types, isoindoline types, and quinophthalone types; yellow pigments such as titanium yellow and chrome yellow; black pigments such as carbon black; and the like, and they can be used solely, or two or more of them can be used in combination.

Examples of the dye include azo dyes, anthraquinone dyes, indigo dyes, carbonium dyes, quinonimine dyes, phthalocyanine dyes, and the like, and they can be used solely or two or more of them can be used in combination.

The mixing amount of the above coloring pigment and dye is suitably in the range of 1 to 150 parts by weight, preferably from 3 to 100 parts by weight based on 100 parts by weight of resin solid matter in the coating (D).

Into the colored base coating (D) can be further incorporated suitably additives for coatings, such as extender pigments, curing catalysts, ultraviolet absorbents, coating surface-adjusting agents, rheology-controlling agents, antioxidants, defoaming agents, and waxes, if necessary.

The application of the colored base coating (D) can be conducted by rotary electrostatic coating, air spraying (two-fluid nozzle), airless spraying, and the like.

In the method of the present invention, each coating may be cured at every coating stage to form a multilayer or a multilayer film obtainable after successive applications of respective coatings may be cured simultaneously. Suitably, it is desirable that the metallic base coating (A) is applied, the colored clear coating (B) is applied onto the resulting uncured coating film, and, after the bilayer coating film is simultaneously cured, the clear coating (C) is applied, if necessary. Moreover, it is desirable that the colored base coating (D) is applied, the metallic base coating (A) is applied onto the resulting uncured coating film, and after the both coating films are cured, the colored clear coating (B) is applied and cured, and further the clear coating (C) is applied and cured, or the colored base coating (D) and the metallic base coating (A) are successively applied, the colored clear coating (B) is applied on the resulting uncured coating film, and after the trilayer coating film is simultaneously cured, the clear coating (C) is applied. The clear coating (E) may be applied onto the cured or uncured coating film obtained by the clear coating (C) and then cured or may be simultaneously cured together with the underlying film. For curing these coating films, it is usually desirable to heat them at a temperature of about 100 to 180° C. for a period of about 10 to 60 minutes.

It is suitable that the film thickness (dry film thickness) of the coating film obtained by the above metallic base coating (A) is in the range of 0.3 to 30 μm, preferably 1 to 20 μm; the film thickness (dry film thickness) of the coating film obtained by the colored clear coating (B) is in the range of 15 to 55 μm, preferably 25 to 40 μm, and the film thickness (dry film thickness) of the coating film obtained by the clear coating (C) is in the range of 15 to 55 μm, preferably 25 to 40 μm. Moreover, the film thickness (dry film thickness) of the coating film obtained by the colored base coating (D) is in the range of 15 to 60 μm, preferably 20 to 40 μm. Furthermore, in the case that the clear coating (E) is further applied, the film thickness (dry film thickness) of the coating film obtained by the clear coating (E) is in the range of 15 to 55 μm, preferably 25 to 40 μm.

EXAMPLES

The following will describe the present invention further in detail with reference to Examples. In this connection, "part(s)" and "%" mean "part(s) by weight" and "% by weight", respectively, unless otherwise stated.

Production of Metallic Base Coating (A)

Production Example 1

To a mixture composed of 70 parts of an acrylic resin containing a hydroxyl group and 30 parts of a butyl etherified melamine resin was added a mixed dispersion of 35 parts of an aluminum flake (average particle size of about 15 μm, thickness of 0.1 to 1 μm) and an organic solvent (xylene/ethyl acetate=1/1 by weight), followed by stirring. The whole was adjusted to a viscosity of 13 seconds (Ford cup #4, 20° C.) with a mixed solvent of ethyl acetate/toluene/"Swazol #1000" (manufactured by Cosmo Oil Co., Ltd., an aromatic hydrocarbon solvent)=50/20/30, whereby a metallic base coating (A-1) was obtained.

Production Example 2

A metallic base coating (A-2) was obtained in the same manner as in Production Example 1 except that the amount of aluminum was changed to 30 parts based on 100 parts of resin solid matter and further 5 parts of phthalocyanine blue (a blue pigment) was mixed in Production Example 1.

Production Example 3

A metallic base coating (A-3) was obtained in the same manner as in Production Example 2 except that the same amount of perylene red (a red pigment) was mixed instead of phthalocyanine blue in Production Example 2.

Production Example 4

A metallic base coating (A-4) was obtained in the same manner as in Production Example 1 except that deposited aluminum flake having an average particle size of about 15 μm and a thickness of 0.01 to 0.1 μm was mixed as the aluminum flake in an amount of 40 parts based on 100 parts of resin solid matter in Production Example 1.

Production Example 5

A metallic base coating (A-5) was obtained in the same manner as in Production Example 2 except that the amount of aluminum was changed to 15 parts based on 100 parts of resin solid matter in Production Example 2.

Production Example 6

A metallic base coating (A-6) was obtained in the same manner as in Production Example 5 except that an aluminum flake having an average particle size of about 10 μm and a thickness of 0.1 to 1 μm was used as the aluminum powder in Production Example 5.

Production Example 7

A metallic base coating (A-7) was obtained in the same manner as in Production Example 1 except that the amount of aluminum was changed to 15 parts based on 100 parts of resin solid matter in Production Example 1.

Production of Colored Clear Coating (B)

Production Example 8

A mixture composed of 70 parts of an acrylic resin containing a hydroxyl group, 30 parts of a butyl etherified melamine resin, and 3 parts of phthalocyanine blue was mixed with and dispersed in an organic solvent (xylene/ethyl acetate=1/1 by weight), and the whole was adjusted to a viscosity of 20 seconds (Ford cup #4, 20° C.) with "Swazol #1000" (manufactured by Cosmo Oil Co., Ltd., an aromatic hydrocarbon solvent), whereby a colored clear coating (B-1) was obtained.

Production Example 9

A colored clear coating (B-2) was obtained in the same manner as in Production Example 8 except that the same amount of perylene red (a red pigment) was mixed instead of phthalocyanine blue in Production Example 8.

Production Example 10

A colored clear coating (B-3) was obtained in the same manner as in Production Example 8 except that the amount of phthalocyanine blue was changed to 4 parts in Production Example 8.

Production Example 11

A colored clear coating (B-4) was obtained in the same manner as in Production Example 9 except that the amount of perylene red was changed to 4 parts in Production Example 9.

Production of Clear Coating (C)

A mixture composed of 50 parts of an acrylic resin containing a carboxyl group, 50 parts of an acrylic resin containing an epoxy group, 1 part of "Tynuvin 900" (manufactured by Ciba Specialty Inc, an ultraviolet absorbent), 1 part of tetrabutylammonium bromide, and 0.1 part of "BYK-300" (manufactured by BYK Chemie, a surface adjusting agent) was adjusted to a viscosity of 20 seconds (Ford cup #4, 20° C.) with "Swazol #1000" (manufactured by Cosmo Oil Co., Ltd., an aromatic hydrocarbon solvent), whereby a clear coating (C-1) was obtained.

Colored Base Coating (D)

A mixture composed of 70 parts of an acrylic resin containing a hydroxyl group, 30 parts of a butyl etherified melamine resin, 10 parts of phthalocyanine blue, 1 part of carbon black, and 5 parts of titanium white was adjusted to a viscosity of 20 seconds (Ford cup #4, 20° C.) with a mixed solvent of xylene/"Swazol #1000"=50/50, whereby a colored base coating (D-1) was obtained.

Application of Coating

Example 1

Onto a substrate to be coated obtained by successively applying a cationic electrodeposition coating and a polyester resin-based intermediate coating onto a defatted and zinc phosphate-treated steel plate and heating to curing, the metallic base coating (A-1) produced in the above was applied so that the film thickness after application became about 3 μm (as a cured coating film), followed by 3 minutes of standing at room temperature. Thereafter, the colored clear coating (B-1) was applied thereon so that the film thickness after application became about 30 μm (as a cured coating film), followed by 10 minutes of standing and 30 minutes of heating at 140° C. to curing, whereby a coating plate was obtained. The IV value of the coating film obtained by the metallic base coating (A-1) was found to be 270 and the HG value was found to be 48. For the measurement of IV and HG, as mentioned above, a coating plate obtained by applying the metallic base coating on the substrate to be coated and heating it at 140° C. for 30 minutes to curing was used.

Comparative Example 1

A coated plate was prepared in the same manner as in Example 1 except that the metallic coating (A-7) was used instead of the metallic base coating (A-1) and the coating was applied so that the film thickness after application became about 15 μm (as a cured coating film) in Example 1. The IV value of the coating film obtained by the metallic base coating (A-7) was found to be 225 and the HG value was found to be 57.

Example 2

Onto a substrate to be coated obtained by successively applying a cationic electrodeposition coating and a polyester resin-based intermediate coating onto a defatted and zinc phosphate-treated steel plate and heating to curing, the metallic base coating (A-1) produced in the above was applied so that the film thickness after application became about 3 μm (as a cured coating film), followed by 3 minutes of standing at room temperature. Thereafter, the colored clear coating (B-1) was applied thereon so that the film thickness after application became about 30 μm (as a cured coating film), followed by 10 minutes of standing and 30 minutes of heating at 140° C. to curing. The IV value of the coating film obtained by the metallic base coating (A-1) was found to be 270 and the HG value was found to be 48.

After further gradual cooling to room temperature, the clear coating (C-1) was applied so that the film thickness after application became about 30 μm (as a cured coating film), followed by 10 minutes of standing and 30 minutes of heating at 140° C. to curing, whereby a coating plate was obtained.

Examples 3 to 6

Each coating plate was prepared in the same manner as in Example 2 except that each combination shown in Table 1 was used as the metallic base coating and the colored clear coating in Example 2.

TABLE 1

| | | Example | | | | |
|---|---|---|---|---|---|---|
| | | 2 | 3 | 4 | 5 | 6 |
| Metallic base coating | Kind of coating | A-1 | A-2 | A-3 | A-4 | A-4 |
| | IV value | 270 | 250 | 245 | 310 | 310 |
| | HG value | 48 | 46 | 46 | 40 | 40 |
| Kind of colored clear coating | | B-1 | B-1 | B-2 | B-3 | B-4 |
| Kind of clear coating | | C-1 | C-1 | C-1 | C-1 | C-1 |

Comparative Example 2

Onto a substrate to be coated obtained by successively applying a cationic electrodeposition coating and a polyester resin-based intermediate coating onto a defatted and zinc phosphate-treated steel plate and heating to curing, the metallic base coating (A-5) was applied so that the film thickness after application became about 15 μm (as a cured coating film), followed by 3 minutes of standing at room temperature. Thereafter, the colored clear coating (B-1) was applied thereon so that the film thickness after application became about 30 μm (as a cured coating film), followed by 10 minutes of standing and 30 minutes of heating at 140° C. to curing. The IV value of the coating film obtained by the metallic base coating (A-5) was found to be 220 and the HG value was found to be 55.

After further gradual cooling to room temperature, the clear coating (C-1) was applied so that the film thickness after application became about 30 μm (as a cured coating film), followed by 10 minutes of standing and 30 minutes of heating at 140° C. to curing, whereby a coating plate was obtained.

Comparative Example 3

A coating plate was prepared in the same manner as in Comparative Example 2 except that the metallic base coating (A-6) was used instead of the metallic base coating (A-5) in Comparative Example 2. At that time, the IV value of the coating film obtained by the metallic base coating (A-6) was found to be 160 and the HG value was found to be 30.

Example 7

Onto a substrate to be coated obtained by successively applying a cationic electrodeposition coating and a polyester resin-based intermediate coating onto a defatted and zinc phosphate-treated steel plate and heating to curing, the colored base coating (D-1) produced in the above was applied so that the film thickness after application became about 30 μm (as a cured coating film), followed by 3 minutes of standing at room temperature. Thereafter, the metallic base coating (A-2) was applied thereon so that the film thickness after application became about 3 μm (as a cured coating film), followed by 10 minutes of standing and 30 minutes of heating at 140° C. to curing. The IV value of the coating film obtained by the metallic base coating (A-2) was found to be 250 and the HG value was found to be 46.

After further gradual cooling to room temperature, the colored clear coating (B-1) was applied so that the film thickness after application became about 30 μm (as a cured coating film), followed by 10 minutes of standing and 30 minutes of heating at 140° C. to curing, whereby a coating plate was obtained.

Example 8

Onto a substrate to be coated obtained by successively applying a cationic electrodeposition coating and a polyester resin-based intermediate coating onto a defatted and zinc phosphate-treated steel plate and heating to curing, the colored base coating (D-1) produced in the above was applied so that the film thickness after application became about 30 μm (as a cured coating film), followed by 3 minutes of standing at room temperature. Thereafter, the metallic base coating (A-2) was applied thereon so that the film thickness after application became about 3 μm (as a cured coating film), followed by 10 minutes of standing and 30 minutes of heating at 140° C. to curing. The IV value of the coating film obtained by the metallic base coating (A-2) was found to be 250 and the HG value was found to be 46.

Then, after gradual cooling to room temperature, the colored clear coating (B-1) was applied thereon so that the film thickness after application became about 30 μm (as a cured coating film), followed by 10 minutes of standing and 30 minutes of heating at 140° C. to curing. After further gradual cooling to room temperature, the clear coating (C-1) was applied so that the film thickness after application became about 30 μm (as a cured coating film), followed by 10 minutes of standing and 30 minutes of heating at 140° C. to curing, whereby a coating plate was obtained.

Example 9

Onto a substrate to be coated obtained by successively applying a cationic electrodeposition coating and a polyester resin-based intermediate coating onto a defatted and zinc phosphate-treated steel plate and heating to curing, the metallic base coating (A-1) was applied at multi stages so that the film thickness became about 3 μm (as a cured coating film) at each stage and 12 μm in total after 4 stages, followed by 3 minutes of standing at room temperature. Thereafter, the colored clear coating (B-1) was applied thereon so that the film thickness after application became about 30 μm (as a cured coating film), followed by 10 minutes of standing and 30 minutes of heating at 140° C. to curing. The IV value of the coating film obtained by the metallic base coating (A-1) was found to be 305 and the HG value was found to be 42.

After further gradual cooling to room temperature, the clear coating (C-1) was applied so that the film thickness after application became about 30 μm (as a cured coating film), followed by 10 minutes of standing and 30 minutes of heating at 140° C. to curing, whereby a coating plate was obtained.

Performance Evaluation Test

The chroma and deepness feeling of each of the coating plates obtained in the above Examples and Comparative Examples were evaluated as follows. The results are shown in Table 2.

(*1) Chroma (C value): The C value is a value of $C^*_{ab}$ which is ab chroma in $L^*a^*b^*$ color system and, as defined in JIS Z 8729 (1994), the value is represented by the formula using $a^*$ and $b^*$: $C^*_{ab} = [(a^*)^2 + (b^*)^2]^{1/2}$ and is a value representing chroma in $L^*a^*b^*$ color system. The C value was measured using a multiangle goniospectrophotometer "MA68-2" manufactured by X-Rite under a condition of a light-receiving angle of 25 degree, the light-receiving angle being an angle between a specular reflection axis and a light-receiving axis when the coating film was irradiated with a light at an incident angle of 45 degree.

Moreover, with regard to chroma (visually), the coating film surface of each coating plate was visually observed and evaluated according to the following standards.

Standards of visual evaluation:
○: brilliance feeling is excellent and color appearance is bright
Δ: brilliance feeling is inferior and color appearance is slightly muddy
X: brilliance feeling is poor and color appearance is muddy (*2) Deepness feeling: The coating film surface of each coating plate was visually observed and evaluated according to the following standards.

Standards of visual evaluation:
○: brightness change from highlight to shade is large and deepness feeling is observed
Δ: brightness change from highlight to shade is smallish and deepness feeling is somewhat inferior
X: brightness change from highlight to shade is small and no deepness feeling is observed

TABLE 2

|  | Example | | | | | | | | | Comparative Example | | |
|---|---|---|---|---|---|---|---|---|---|---|---|---|
|  | 1 | 2 | 3 | 4 | 5 | 6 | 7 | 8 | 9 | 1 | 2 | 3 |
| Chroma (C value) | 60 | 60 | 66 | 65 | 68 | 67 | 69 | 70 | 65 | 48 | 50 | 45 |
| Chroma (visually) | ○ | ○ | ○ | ○ | ○ | ○ | ○ | ○ | ○ | Δ | Δ | Δ |
| Deep feeling | ○ | ○ | ○ | ○ | ○ | ○ | ○ | ○ | ○ | Δ | Δ | X |

The invention claimed is:

1. A coating method comprising steps of applying a metallic base coating (A) containing an effect pigment on a surface to be coated and subsequently applying a colored clear coating (B) thereon,
   wherein the metallic base coating (A) forms a coating film having an IV value of 230 or more and a measured value of particle feeling (HG value) on a micro brilliance feeling-measuring apparatus of from 60 to about 40.

2. The coating method according to claim 1, wherein the metallic base coating (A) contains the effective pigment in the range of 5 to 100 parts by weight based on 100 parts by weight of resin solid matter in the coating.

3. The coating method according to claim 1, wherein the metallic base coating (A) contains a coloring pigment and/or a dye in the range of 0.1 to 30 parts by weight based on 100 parts by weight of resin solid matter in the coating.

4. The coating method according to claim 1, wherein a coating film by the metallic base coating (A) is formed in a coating film thickness (dry film thickness) of 0.3 to 5 μm.

5. The coating method according to claim 1, wherein the metallic base coating (A) is applied in multiple coating stages.

6. The coating method according to claim 1, wherein a clear coating (C) is further applied onto the colored clear coating (B).

7. The coating method according to claim 6, wherein the clear coating (C) is a colored clear coating.

8. The coating method according to claim 6 or 7, wherein a clear coating (E) is further applied onto the clear coating (C).

9. The coating method according to claim 1, wherein a colored base coating (D) is applied on the surface to be coated and then the metallic base coating (A) is coated thereon.

10. The coating method according to claim 1, wherein the metallic base coating (A) forms a coating film having an IV value of from about 245 to about 310 and a measured value of particle feeling (HG value) on a micro brilliance feeling-measuring apparatus of from about 60 to about 40.

11. The coating method according to any one of claims 1 to 9, wherein each coating is cured by baking or preheating at every applying stage or respective coatings are applied successively and then the resulting multilayer coating film is simultaneously cured by baking or preheating.

* * * * *